Sept. 13, 1955
P. L. MENAUL
2,717,876
ACIDIZING WELLS
Filed Oct. 2, 1950
3 Sheets-Sheet 1
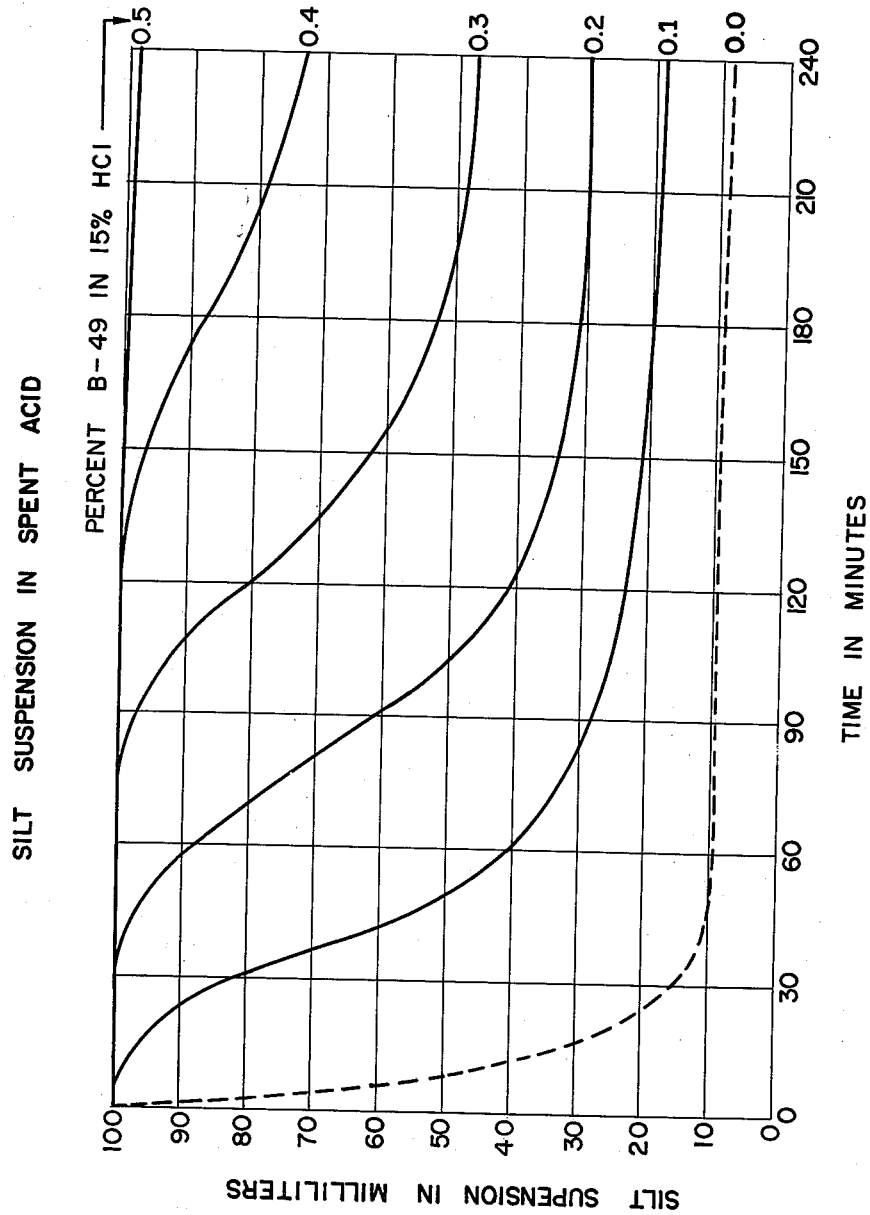
FIG. 1
PAUL L. MENAUL
INVENTOR.
BY 
ATTORNEY

PAUL L. MENAUL
*INVENTOR.*

BY ⟨signature⟩

*ATTORNEY*

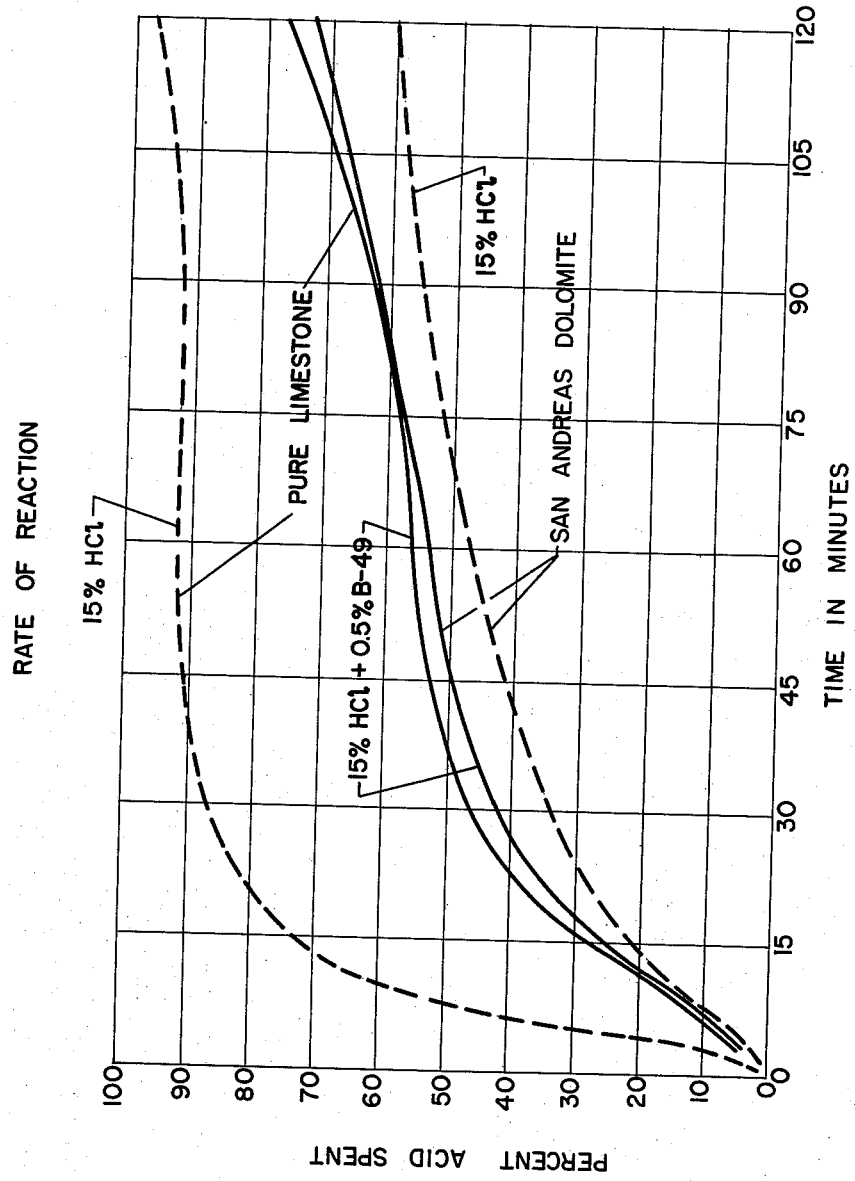
FIG. 3
PAUL L. MENAUL
INVENTOR.
BY 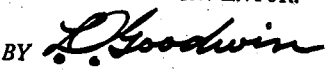
ATTORNEY

United States Patent Office 2,717,876
Patented Sept. 13, 1955

2,717,876

ACIDIZING WELLS

Paul L. Menaul, Tulsa, Okla.

Application October 2, 1950, Serial No. 187,856

8 Claims. (Cl. 252—8.55)

The present invention relates to the treatment of wells with acids for the purpose of increasing the production thereof. More particularly, this invention relates to an improved acid for treating wells.

In the acid treatment of limestone and dolomite formations for the purpose of increasing the permeability and productivity thereof, a charge of acid is introduced through the well into the formation. The acid is allowed to remain in contact with the limestone and dolomite for a short time until it has dissolved some of the acid-soluble constituents of the formation. The acid becomes spent in a few minutes and is then withdrawn as by flowing or pumping the well. Although the use of well acids of the prior art have in many cases greatly increased the permeability and producing rate of a formation, they have not been altogether satisfactory for a number of reasons. For example, since limestone and dolomitic formations contain varying amounts of acid-insoluble materials, the solubility of these formations in muriatic acid may be as low as 50 or 60%. I have found that the residue—i. e., the acid insoluble portion of the formation—is in many cases a fine clayey silt which tends to settle out of the spent acid. Thus, while the acid may enlarge part of the pores of a formation near a well, the deposition of this silt in the formation appears to cause a complete plugging of other pores masking or negating the potential effectiveness of the acid job.

It is therefore an object of this invention to provide an improved composition of matter for acidizing formations. Another object of this invention is to provide an improved well acid which obviates the difficulties encountered in the use of prior well acids. A further object of this invention is to provide a well treating acid which prevents clogging of the permeable channels of a partially acid-soluble, calcareous formation with the acid-insoluble silt particles liberated from the formation by the action of the acid. A still further object of this invention is to provide an additive for well acids which inhibits settling of the silty residue so that it may be removed from the formation with the spent acid and, in addition, regulates the rate of reaction of the acid on the formations.

These and other objects of this invention will become apparent from the following description in which reference will be made to the accompanying drawings. In these drawings:

Figure 1 is a graph showing the difference in settling rate for silt initially suspended in spent plain acid and in the spent acid containing various percentages of surface-active agent according to this invention;

Figure 3 is a graph showing the rates of reaction on pure limestone and on pure dolomite of both plain acid and of acid of the same concentration compounded according to this invention.

Figure 2:
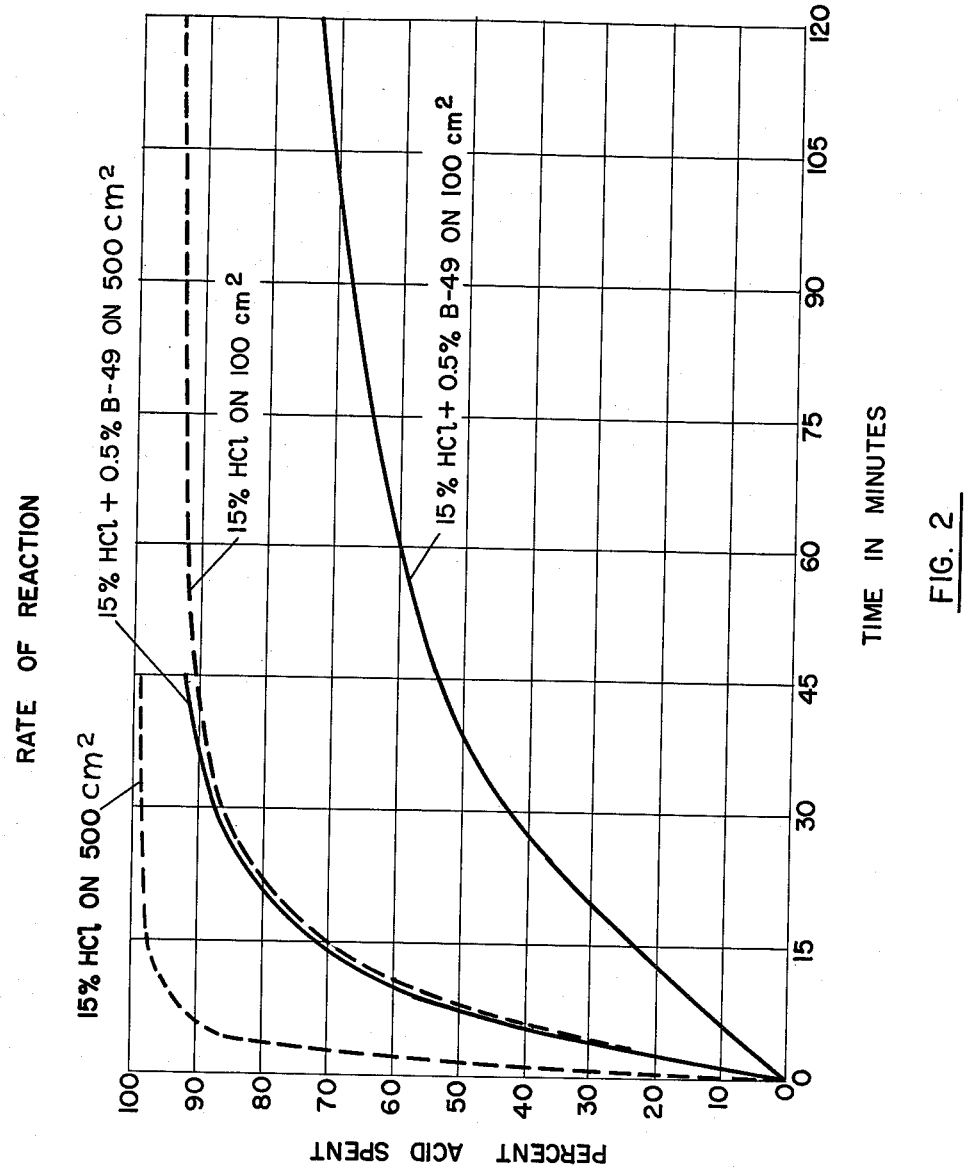
Figure 2 is a graph showing the rate of reaction on different amounts of pure limestone of plain acid and of acid having the same concentration but containing an additive according to this invention.

I have found that the objects of this invention may be accomplished by adding certain surface-active agents to an acid used in acidizing a well. The acid may be any of the acids used in the treatment of wells for the purpose of enlarging the flow channels of the formation; e. g., hydrochloric, hydrofluoric, mixtures thereof, or the like. In general, any acid which, upon reaction with a formation, forms a water-soluble salt may be treated with these selected surface-active agents to accomplish these objects.

The surface-active agent is, in the first place, non-ionic in strong acid solutions or so weakly ionic as to be substantially non-ionic. As is customary in this art, non-ionic surface-active agents will in this specification and claims include those water-soluble compounds which do not give a positive test for anionic or cationic surface-active agents. Such tests are described by Schwartz and Perry in Surface Active Agents—Their Chemistry and Technology, published in 1949 by Interscience Publishers, Inc., New York. This class of surface-active agent includes a number of hydrophobic organic compounds which have been made hydrophilic by esterification with an alkene oxide.

A preferred surface-active agent of this type is made from a hydrophobic acid, abietic acid, or wood rosin, a diterpene acid, which becomes hydrophilic when esterified under pressure and heat with sufficient alkene oxide to provide a product having an average molecular weight of at least 1200. A non-ionic surface-active agent of this type having an average molecular weight of 1200, synthetic B–49, manufactured by the Hercules Powder Company, is a very effective additive for strong acids to cause dispersion and prevent the settling of silt in spent acid. This surface-active agent is sold commercially by Hercules Power Company as "Unisol." This surface-active agent is prepared by the esterification of abietic acid as is well known in the art. During this esterification reaction the reactive hydrogen, which is connected to an oxygen atom in the acid radical (COOH) of the abietic acid

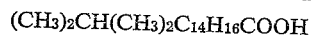
$(CH_3)_2CH(CH_3)_2C_{14}H_{16}COOH$ attaches to the oxygen atom of the ethylene oxide $(CH_2)_2O$ and produces an ethylene glycol ester of abietic acid, thus:

$(CH_3)_2CH(CH_3)_2C_{14}H_{16}COOCH_2CH_2OH$

In the presence of excess ethylene oxide and under the proper conditions of temperature and pressure the reactive hydrogen appears to continue to add ethylene oxide to the ester until at least 20 mol. weights per mol. weight of abietic acid have been added. The reaction product is then a polyethylene glycol ester of abietic acid with the probable formula

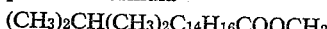
$(CH_3)_2CH(CH_3)_2C_{14}H_{16}COOCH_2$
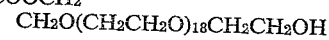
$CH_2O(CH_2CH_2O)_{18}CH_2CH_2OH$ having an average molecular weight of at least 1200.

These surface-active silt dispersants may be mixed with the acid at any time before the acid is injected into the well. The amount of dispersant appears to depend upon the volume of the acid. That is, the concentration of the acid may vary from 5 to 20% or more; but, the residue or spent acid having about the same acid concentration, the amount of surface-active agent-dispersant appears to depend upon the volume of material injected into the well. I have found that any amount of surface-active agent is effective to prevent settling of the silty residue. I prefer, however, to add more than about 0.1%, typically about 0.5% or more, by volume of the surface-active agent to the treating solution.

The acid containing the non-ionic surface-active agent and any other additive desired is injected through the well into a formation in accordance with the regular acidizing procedure. The acid may be confined to selected zones, gelled, or in any other way handled like other acids.

As pointed out hereinafter, these surface-active agents have the property of retarding the reaction rate of an acid on limestone formations, so it is sometimes desirable to leave the acid in contact with the formation longer than is the case with regular acid.

Referring now, more particularly, to Figure 1 to explain the nature of this invention, an excess of limestone in the form of small cores from the Fort Riley formation, obtained in Grant County, Kansas, was exposed under 1000 pounds' pressure to regular 15% hydrochloric acid and to the same acid containing 0.5% of B–49 non-ionic surface-active agent. After the acid was completely spent, the bombs containing the samples were thoroughly agitated to suspend the silty residue. While the residue was still in suspension, the acid was drawn off into a 100 ml. graduate. An equal amount of each spent acid was placed in each graduate, and the volume of the silty acid below clear acid was plotted against time in minutes. It will be noted that within about 30 minutes the silt in the spent regular acid had all settled and reached a substantially stable volume of about 10 ml., while practically no settling could be detected even after 240 minutes in the sample containing 0.5% of the non-ionic surface-active agent. More dilute solutions of the surface-active agent inhibited settling of the residue somewhat in proportion to concentration of surface-active agent. There was no noticeable difference in the viscosity of the spent acid with the suspended silt and without the silt. Thus, it will be apparent that, with these reagents, the removal of silty residue from calcareous formations is greatly facilitated, whereby the pores enlarged by the acid will not become plugged if the spent acid is allowed to stand in the formation for a short time.

The addition of surface-active agents of the type specified appears to produce, in addition to the properties above set out, a number of other properties which are very desirable in well acids. Referring now more particularly to Figure 2, 100 ml. samples of regular 15% HCl and regular 15% HCl containing 0.5% of B–49 non-ionic, surface-active agent were each placed in contact, at 1,000 p. s. i. and 80° F., with an excess of pure limestone, in the form of small cores, having, respectively, 100 and 500 square centimeters exposed to the acid. At short intervals, the concentration of the acid was determined and the results of each test plotted. The rate of acid reaction is, as indicated, materially retarded in the presence of both 100 and 500 square centimeters of acid-soluble limestone. For example, after 30 minutes of contact with the 100 square centimeter sample of limestone, the acid containing the surface-active agent was less than half spent, while the regular acid was almost completely spent. The same relationship was true for the sample containing 500 square centimeters of limestone except that the reactions were more rapid in both the regular and the treated acids in the presence of the 500 square centimeters of acid-soluble limestone. Thus, while regular acid enlarges the flow channels of the formation considerably, adjacent to the well, the retarded acid may be pumped back into the flow channels substantially further, as much as 10 or more times further, before the acid becomes completely spent and non-reactive, leaving enlarged channels which will be more effective in flowing the reservoir oil to the well.

It is well known that in the so-called dolomitic limes, that is, the limestone formations which contain dolomite, acid treatments are much less effective than in pure limestone formations. The Strawn lime of north Texas and the Madison lime of Wyoming are examples of such dolomitic limes. When such formations are acidized, the acid apparently becomes spent on the limestone without materially affecting the dolomite; and the productivity is increased only to a small degree, if at all. Referring now to Figure 3, tests were conducted at 80° F. and at 1,000 p. s. i. on pure limestone and on San Andreas dolomite, each having 100 square centimeters of surface area, with 100 ml. samples of regular 15% hydrochloric acid alone and with 0.5% of B–49 non-ionic surface-active agent. The concentration of the acid versus time for each of the samples is shown. These typical curves show that the non-ionic surface-active agent accelerated the reaction rate of the acid on the dolomite and retarded the reaction rate on the limestone, thereby substantially equalizing the reaction rate of the improved acid on the two when they are mixed so that such dolomitic limes may be acidized almost as effectively as pure limestone formations.

It will thus be apparent that I have provided an improved well treating agent and that my treating agent is subject to certain modifications. The invention is, however, not to be construed to be limited by the modifications presented, since they were presented for the purpose of illustration. The invention should, instead, be limited only by the scope of the appended claims.

I claim:

1. A well treating fluid for acidizing calcareous formations comprising a well treating acid and a polyethylene glycol ester of abietic acid having an average molecular weight of at least 1200.

2. A well treating fluid for acidizing calcareous formations containing clayey material comprising an acid capable of forming a water-soluble salt solution by reaction with said calcareous formation and polyethylene glycol ester of abietic acid in which said ester contains at least 20 mol. weights of ethylene oxide radicals per mol. weight of abietic acid, the concentration of said ester in said acid being sufficient to suspend said clayey material in said solution.

3. A well treating fluid according to claim 2 in which the concentration of said ester is at least 0.1 per cent by volume of said acid.

4. A well treating fluid according to claim 2 in which the concentration of said ester is about 0.5 per cent by volume of said acid.

5. A composition of matter comprising by volume about 100 parts of hydrochloric acid and about 0.5 parts of an ester of abietic acid and ethylene oxide, said ester having a molecular weight of about 1200.

6. A method of treating a calcareous formation containing clayey material comprising injecting into said formation an acid capable of dissolving said formation, said acid containing a sufficient amount of an ester of abietic acid and ethylene oxide of an average molecular weight of 1200 to suspend said clayey material in the spent acid, and removing said clayey material in suspension in said spent acid from said formation.

7. A method according to claim 6 wherein the concentration of said ester is at least 0.1 per cent by volume of said acid.

8. In a process of acidizing a well wherein a strong mineral acid solution is injected into a calcareous formation containing clayey material to enlarge the flow channels adjacent said well, the improvement comprising disposing in said solution a sufficient amount of the reaction product of abietic acid and ethylene oxide to suspend said clayey material in the spent acid solution, said reaction product having an average molecular weight of 1200.

References Cited in the file of this patent

UNITED STATES PATENTS

| | | |
|---|---|---|
| 2,128,160 | Morgan | Aug. 23, 1938 |
| 2,128,161 | Morgan | Aug. 23, 1938 |
| 2,265,759 | Lawton | Dec. 9, 1941 |
| 2,281,419 | De Groote et al. | Apr. 28, 1942 |
| 2,320,673 | Stewart | June 1, 1943 |
| 2,356,205 | Blair et al. | Aug. 22, 1944 |

OTHER REFERENCES

Rohm and Haas Co. Booklet, December 1943, Triton NE.